(12) United States Patent
McNeff

(10) Patent No.: US 6,779,842 B2
(45) Date of Patent: Aug. 24, 2004

(54) CHILD AUTOMOTIVE SAFETY SEAT WITH INTEGRAL SEAT BELT TENSIONER

(76) Inventor: James R. McNeff, 3482 N. Linder Rd., Eagle, ID (US) 83616-2106

( * ) Notice: Subject to any disclaimer, the term of this patent is extended or adjusted under 35 U.S.C. 154(b) by 0 days.

(21) Appl. No.: 10/308,069

(22) Filed: Dec. 2, 2002

(65) Prior Publication Data

US 2003/0127894 A1 Jul. 10, 2003

Related U.S. Application Data

(60) Provisional application No. 60/338,415, filed on Nov. 30, 2001.

(51) Int. Cl.[7] .................................................. A47C 1/08
(52) U.S. Cl. .................... 297/250.1; 297/468; 297/473; 297/463.1
(58) Field of Search .......................... 297/250.1, 463.1, 297/463.2, 468, 493, 483, 484, 216.17

(56) References Cited

U.S. PATENT DOCUMENTS

| 3,574,342 A | 4/1971 | Berns ........................... 254/79 |
| 3,749,366 A | 7/1973 | Brucker ....................... 254/164 |
| 3,826,473 A | 7/1974 | Huber ......................... 254/164 |
| 3,988,007 A | 10/1976 | Freiburger, Jr. ............. 254/164 |
| 4,510,652 A | 4/1985 | van Iperen ............... 24/68 CD |
| 4,604,773 A | 8/1986 | Weber et al. ................. 24/71.2 |
| 4,688,849 A | 8/1987 | Tsuge et al. ................. 297/250 |
| 4,886,315 A | 12/1989 | Johnson ....................... 297/250 |
| 5,039,169 A | 8/1991 | Bougher et al. ............. 297/484 |
| 5,579,561 A | 12/1996 | Smith et al. ................... 24/170 |
| 5,611,596 A | 3/1997 | Barley et al. ........... 297/256.13 |
| 5,620,231 A * | 4/1997 | Marker et al. ............ 297/250.1 |
| 5,779,319 A | 7/1998 | Merrick ....................... 297/484 |
| 5,839,789 A | 11/1998 | Koledin ....................... 297/476 |
| 5,902,015 A * | 5/1999 | Allcock ..................... 297/463.1 |
| 6,024,408 A | 2/2000 | Bello et al. ............... 297/250.1 |
| 6,092,869 A * | 7/2000 | Ziv ........................... 297/250.1 |
| 6,237,889 B1 * | 5/2001 | Bischoff ..................... 248/622 |
| 6,491,348 B1 * | 12/2002 | Kain ............................ 297/484 |
| 6,543,846 B2 * | 4/2003 | Cone ....................... 297/250.1 |
| 2001/0010431 A1 * | 8/2001 | Sasaki et al. ............. 297/250.1 |
| 2002/0195867 A1 * | 12/2002 | Barger et al. ............... 297/484 |
| 2003/0111883 A1 * | 6/2003 | Abel ........................ 297/250.1 |

* cited by examiner

Primary Examiner—Peter M. Cuomo
Assistant Examiner—Erika Garrett
(74) Attorney, Agent, or Firm—Pedersen & Co., PLLC; Ken J. Pedersen; Barbara S. Pedersen (57) ABSTRACT

This invention provides a child safety seat with an integral seat belt tensioner for properly securing the seat to the passenger seat of an automotive vehicle by taking up the slack in the seat belt after it has been fastened through the child seat. The tensioner pulls or pushes the seat belt so that the few inches of slack that usually exist are eliminated by the tensioner. The safety seat is adapted to have internal space, either in its back and/or below the seat, to accommodate the tensioner and the belt movement so that the controls, tensioner, and/or other moving parts are out of the reach of the a child in the seat. A preferred version of the tensioner includes motor and gearing to move a belt holder up and down generally along the rear of the safety seat, for tightening and loosening the belt, respectively.

13 Claims, 6 Drawing Sheets

CHILD AUTOMOTIVE SAFETY SEAT WITH INTEGRAL SEAT BELT TENSIONER

This application claims priority of Provisional Application Ser. No. 60/338,415, filed Nov. 30, 2001, and entitled "Child Automotive Safety Seat with Integral Seat Belt", which is hereby incorporated by reference.

BACKGROUND OF THE INVENTION

1. Field of the Invention

This invention relates generally to child safety seats for use in an automotive vehicle and more particularly to properly securing a child's safety seat to a passenger seat of the vehicle.

2. Related Art

Today's passenger vehicles have a seat restraint device, commonly known as a "seat belt," for each occupant the vehicle is designed to carry. However, use of a conventional seat restraint by a small child can result in serious injury to the child in the event of a collision or other accident. To mitigate this problem, child safety seats and other devices have been developed which improve the safety afforded the child passenger. Such safety seats are typically secured to the vehicle's passenger seats directly by the vehicle's seat belts.

Typically the driver and passengers sitting at the sides of the vehicle are provided with a restraint apparatus comprised of an integrated shoulder harness and a lap belt, sometimes termed a "3-point restraint system." Occupants sitting in a center position often have only a lap belt. For the integrated shoulder harness/lap belt device of the 3-point system, the shoulder portion is normally attached to an inertial locking wind-up reel located in the vehicle's door pillar. The lap portion is attached to a fixed anchor near the floor of the vehicle adjacent to the door. The shoulder and lap portions are connected together as a continuous length upon which slides the male seat belt buckle. The vehicle's mating female buckle is typically attached to a short, upright supported belt section, also securely anchored to the floor of the vehicle but near the center of the vehicle.

When the vehicle stops abruptly, the inertial reel locks up to restrain the occupant, however a few inches of belt are released prior to final lock up of the reel. This small amount of belt release is acceptable, in fact desirable, for an adult to minimize his or her injuries. However, this same small belt release is unacceptable when the belt is being used to secure a child safety seat.

To maximize the child's safety, it is recommended that the child, in an appropriately sized child safety seat, always be placed in the center position of the rear seat of the vehicle. In this position the child's seat is secured with the lap belt and use of the 3-point restraint system is avoided. In this central position, the child's safety seat is secured to the vehicle by threading one end (typically the longer, male end) of the vehicle's seat belt through the appropriate slots in the safety seat and connecting this male end with the mating female end. Typically the loose, male end of the lap belt is pulled to tighten it.

According to the Governor's Traffic Safety Committee of the New York State Department of Transportation: "The child safety seat should be attached as tightly as possible with the vehicle's safety belt. The seat should not move more than 1 inch toward the front of the car or side to side." In the recommended rear, center seat position, it is very difficult for an adult to bend over and lean inward to grasp the loose end of the lap belt and then generate sufficient pulling force to satisfactorily urge the child's seat firmly down and rearward against the vehicle's seat back. Because of this difficult access by an adult to the rear, center seat position, only rarely is a child's safety seat properly and safely installed.

A few inventors have addressed these problems. For example Smith (U.S. Pat. No. 5,579,561), issued Dec. 3, 1996, provides a seat belt gripping device for a 3-point restraint system that clamps and locks the shoulder portion and lap portion of a seat belt together to secure the child safety seat in place on the car seat. The device is tamper resistant so that children and infant seat occupants will not be able to remove the devices while they are in use. This device is designed to eliminate the need to remove slack from the shoulder portion of the seat belt to ensure that the child safety seat does not move in a forward direction during a sudden stop or collision. This device and others like it only addresses the removal of slack from shoulder harness type belts. It does not facilitate tightening the lap-type seat belt to achieve the recommend degree of firmness in securing the safety seat.

Barley, et al. (U.S. Pat. No. 5,611,596), issued Mar. 18, 1997, specifically addresses the issue of inadequately tightened seat belts when used to secure child safety seats. Barley discloses a child safety seat with an integral seat belt tightening mechanism. Barley's seat comprises a seat body having a seat portion and a backrest portion. Guides on the seat body define a strap path for a strap of an adult seat belt to be used to secure the child seat body to a vehicle seat. A strap deflecting lever is movable between a first position clear of the strap path and a second position in which the strap is deflected and thus tightened. Although this design increases the degree of seat belt tightness, it has only two tension positions, a minimum and a maximum. It does not permit a continuous adjustment of the tension to assure that the recommended standards are developed. In addition, Barley's child seat is complex and would be expensive to manufacture when one considers its internal seat belt (strap) tightening mechanism. This mechanism also adds to the weight of the safety seat which makes its transportation and installation difficult.

Koledin (U.S. Pat. No. 5,839,789), issued Nov. 24, 1998, discloses a seat belt tensioning device and a system for tightly positioning a child safety seat within the confines of a vehicle comprising a belt receiving member and a tensioning means for engaging the belt receiving member and tensioning the seat belt. Koledin shows some similarity to my invention, however, he introduces substantial reliability and cost questions by his incorporation of spring biased pinch clamps, pinch clamp release levers, fixed clamp stops, a split cylinder wind-up reel, cable guides, a tensioning knob, a worm drive, a worm gear and a torsion rod. In an alternative embodiment he introduces, but does not illustrate, a screw drive and cantilever arm in lieu of the split cylinder. The arm would pull the seat belt upward to increase its tension. Koledin also suggests operating his tensioning knobs and pinch clamps with an electric motor.

Bello, et al. (U.S. Pat. No. 6,024,408), issued Feb. 15, 2002, takes a direct approach to assuring the proper installation of a child safety seat. Bello provides an auxiliary web belt that is wound around a drum of a winch. The winch is mounted on a pressure bar which is placed on a child safety seat after the seat is in position on the passenger seat, but before the child is placed in the seat. Fasteners at the ends of the auxiliary belt are attached to a vehicle seat belt that is not to be used for the child's seat. Alternatively, the fasteners may be directly attached to the vehicle's seat belt anchoring points. After this belt is properly anchored to the vehicle, the winch is actuated to tighten the belt thus pressing the child's seat into the passenger seat. After the child's seat is properly pressed against the passenger seat, the vehicle's unused passenger seat belt is passed through the openings provided in the child's seat and tightened to finally secure the child seat to the passenger seat of the vehicle. The winch is then released and the auxiliary belt, winch and pressure bar are removed. The child may then be placed in the properly secured safety seat. Bello's device would appear to be effective, but at the expense of having to attach and later remove a fairly complex, multi-component secondary device i.e. the auxiliary belt, the winch, and pressure bar in a moderately complex process.

Therefore, it is a primary object of the extant invention to provide a device that eliminates the complexities and other shortcomings of the prior art while still assuring that child safety seats are properly positioned and tightened. It is a further object of this invention to provide a child's automotive safety seat with an integral seat belt tensioning capability that is easy and simple to use. It is an additional object of this invention to provide such a safety seat that is also robust and inexpensive to produce.

SUMMARY OF THE INVENTION

This invention provides a child safety seat with an integral seat belt tensioner for properly securing the child safety seat to the passenger seat of an automotive vehicle. The invented seat belt tensioner is adapted to pull or push the belt, after the belt is buckled, to take up any slack that is in the belt. This pulling or pushing may comprise moving the belt upward and/or forward away from the seat, or may even comprise moving the belt sideways or downward. Preferably, the moving parts for pushing or pulling the belt, and the portion of the belt being pushed or pulled, is contained within the child safety seat, so that the tensioner is integrally provided in the safety seat and also out of reach of the child.

This preferred embodiment comprises a seat frame with a mechanism contained therein for receiving the seat belt and for pulling it upwards generally vertically at the rear of the safety seat. The safety seat frame has left and right sides and a central rear interior space holding the tensioner. The preferred tensioner comprises a belt holder, preferably a tube or bracket, through which the seat belt is placed so that the belt passes from side to side across the back of the safety seat. The tensioner is adapted to raise and lower the belt holder, and therefore the belt, in response to actuation of a motor, a manual crank or other handle, or other actuation system.

In one embodiment, each side of the seat frame includes a nominally vertically-disposed elongated slot and the belt holder comprises a generally horizontal hollow tube or other member that is moveable upward and downward in the elongated slots. The seat belt is conventionally attached to the vehicle, and one or more of the portions of the buckled seat belt pass through the tube. A mechanism is provided for slideably adjusting the movable tube within the slots. Adjusting the tube upwards, tightens the child's seat against the seat of the vehicle. Adjusting the tube downwards, releases the tension allowing the seat belt to be removed from the tube and the seat to be removed from the vehicle.

The means for slidably adjusting the tube containing the vehicle's seat belt may be various manual or automated systems, but preferably includes a reversible motor and a gear assembly. The preferred gear assembly, operated by the electric motor in the preferred embodiment, comprises a speed reducing pinion gear/ring gear pair, a drive screw rotated by the ring gear, and a drive screw follower that rides up or down the length of the drive screw depending on the rotational direction of the motor. The drive screw follower is fixedly secured to the horizontally disposed belt receiving tube. Thus, as the electric motor is operated in one direction, the seat belt is pulled upward and thus tensioned, thereby safely securing the child's seat to the vehicle's seat. When the direction of the motor is reversed, the tension is released.

These and many other features and attendant advantages of the invention will become apparent as the invention becomes better understood by reference to the following detailed descriptions and accompanying drawings.

DETAILED DESCRIPTION OF THE INVENTION

Figure 1:
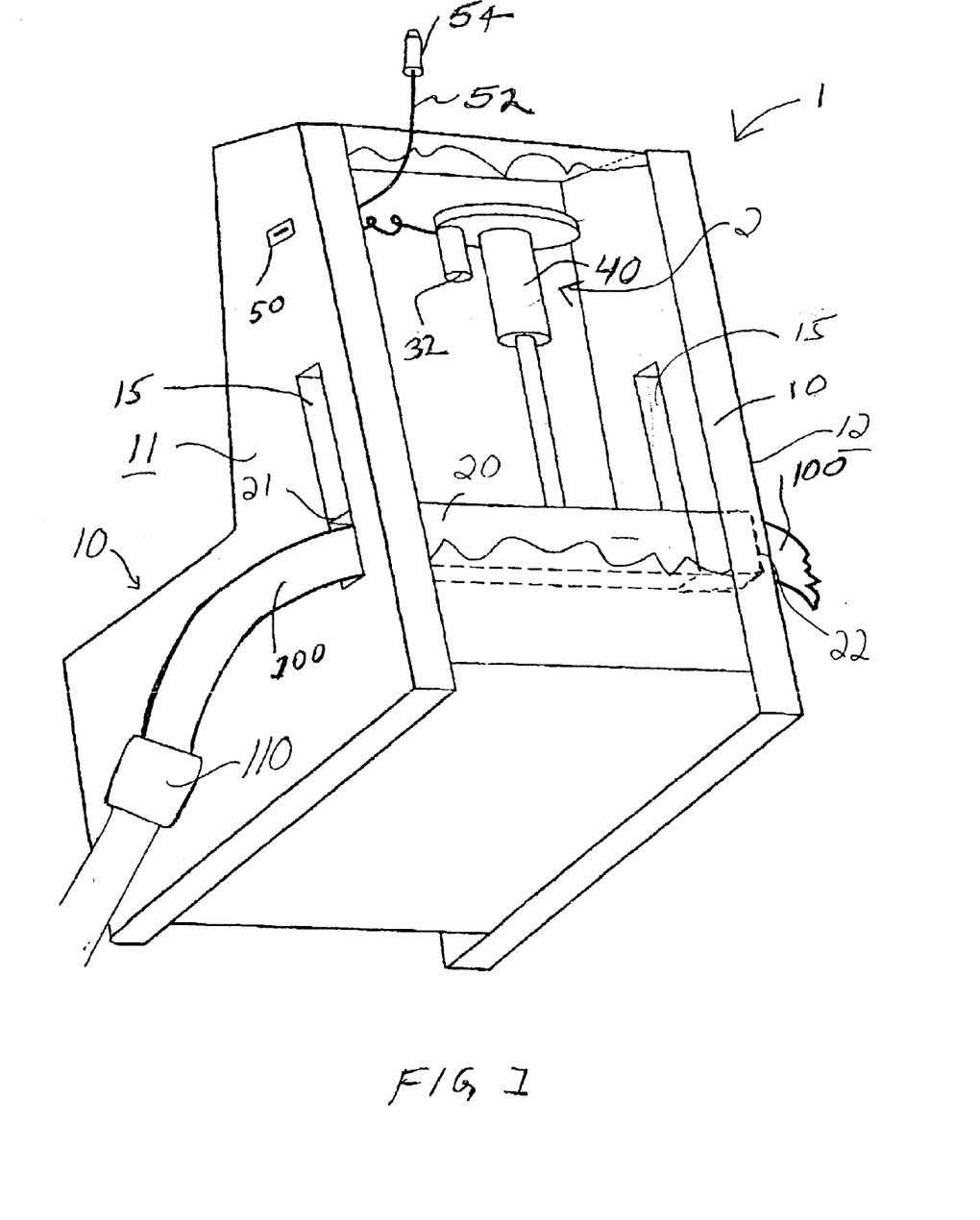
FIG. 1 is the child's safety seat according to one embodiment of the invention, as viewed from the back, with an embodiment of a belt adjustment tube in its lowered position.
Figure 2:
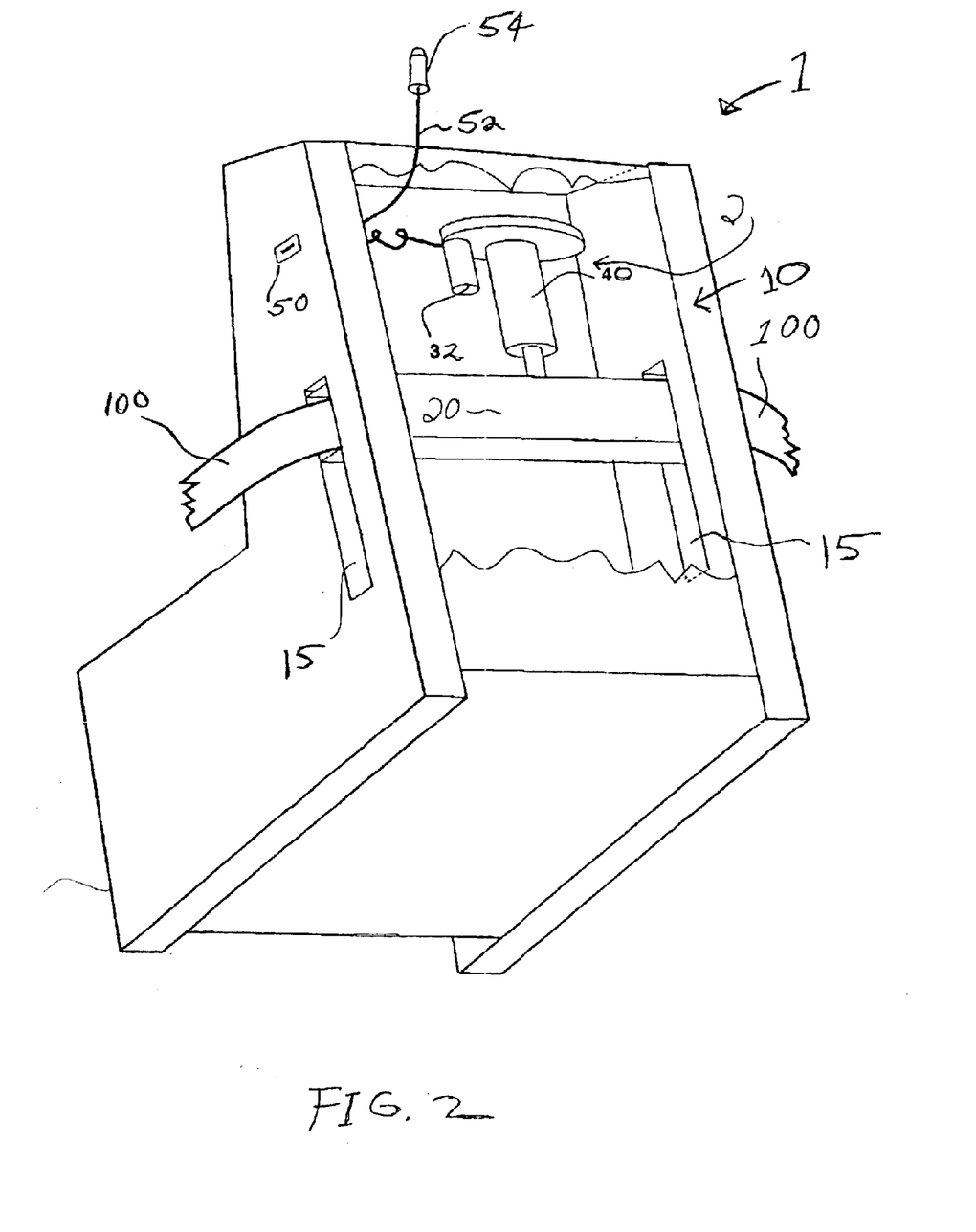
FIG. 2 is of the embodiment depicted in FIG. 1, but with the belt adjustment tube in its raised position.

As shown in FIGS. 1 and 2, the preferred child automotive safety seat 1 comprises a child safety seat frame 10 having left and right sides, each side including a nominally vertically disposed elongated slot 15. The invention further includes tensioner system 2 that comprises seat belt receiving tube 20 slideably received and moveably constrained within slots 15. The safety seat 1 further includes means for slideably adjusting tube 20 within slots 15. This means is operatively connected between frame 10 and tube 20. In the preferred embodiment of this invention, means for slidably adjusting tube 20 includes reversible motor 32 and gear assembly 40. Motor 32 receives electrical power from the vehicle and is reversibly controlled by electrical switch 50. In the preferred embodiment, electrical power is provided by connecting switch 50, via cable 52 and plug 54, to the vehicle's accessory receptacle (not shown). For future Original Equipment Manufacture (OEM), it is anticipated that the vehicle will be pre-wired for the child's safety seat much like vehicles now are pre-wired for electrical seat adjustment.

Figure 3:
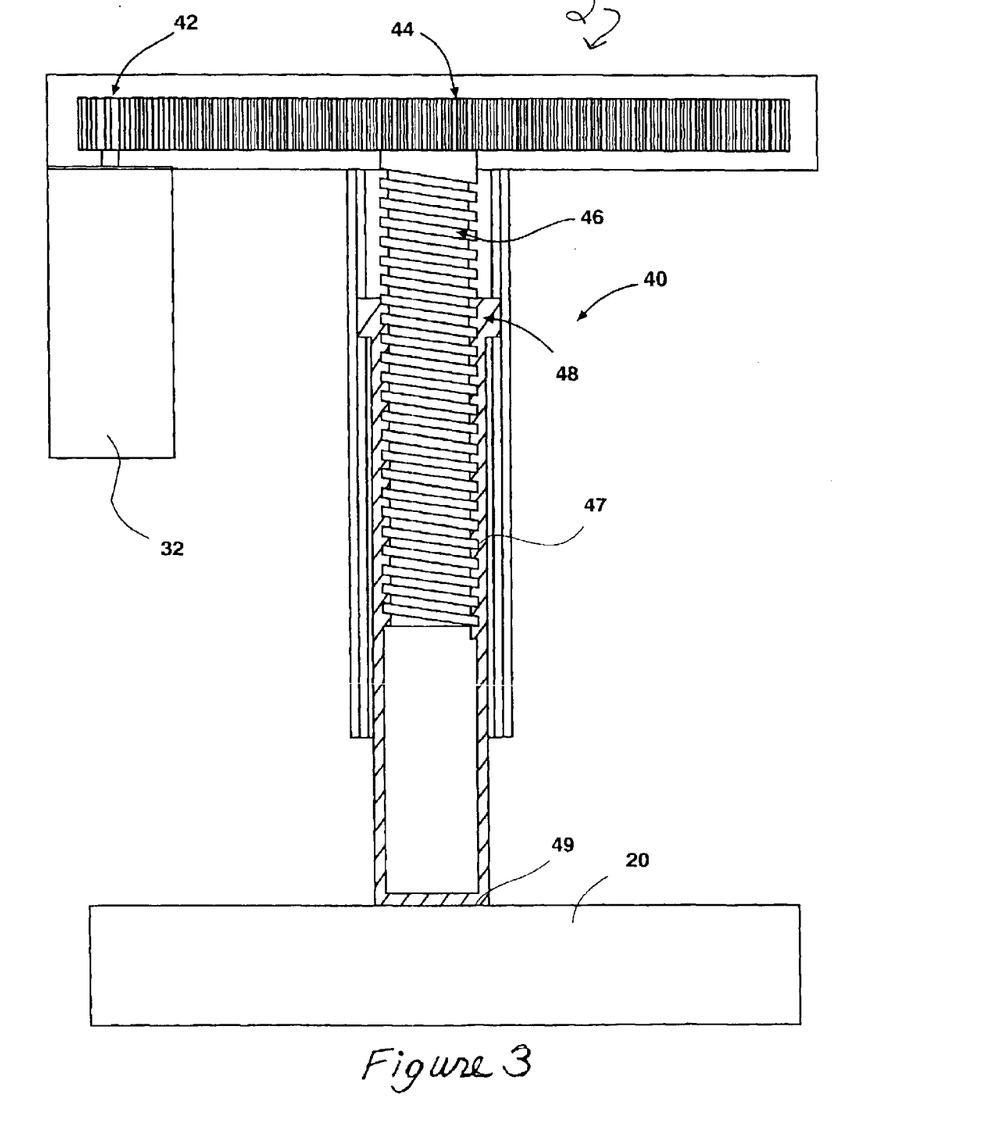
FIG. 3 shows the details of the gear adjustment assembly of one embodiment of the invention.

Referring now to FIG. 3, gear assembly 40 includes pinon gear 42 driven by motor 32 and operatively meshed with ring gear 44. This assembly further includes drive screw 46 which is fixedly attached to the ring gear at its center of rotation. Drive screw follower 47 has first end 48 and second end 49. The first end is operatively threaded onto drive screw 46 and the second end is fixedly connected to seat belt receiving tube 20.

The use and operation of this invention is exceptionally simple and robust. After placing safety seat 1 within the vehicle, the "long" portion of the vehicle's seat belt 100 is passed through belt receiving tube 20 and secured to the conventional buckle 110. Switch 50 is then moved to its tightening position, thus energizing motor 32. Energizing the motor rotates pinon gear 42 at a relatively high rate. Pinon gear 42, engaging ring gear 44, rotates it at a substantially reduced rate. Drive screw 46, fixedly attached to the ring gear, thus rotates at the speed of the ring gear. As the drive screw rotates, follower 48 is driven up the length of the drive screw. Tube 20, containing seat belt 100, is thus pulled upward, being guided by the vertically disposed elongated slots 15 in frame 10. In this fashion, as shown in FIG. 2, the child's safety seat is properly tightened against the seat of the vehicle (which is below and behind the safety seat but not shown in the Figures). Conversely, moving the switch to the release position, operates the motor in the reverse direction, causing the tube to be lowered and the tension in the belt to be released. The belt may then be disconnected from its anchor point and the seat removed.

In the embodiment of FIGS. 1 and 2, the open ends 21, 22 of the tube 20 are at or near the outer side surfaces 11, 12 of the safety seat. This way, the parent or caretaker may easily reach the tube 20 and easily insert the seat belt portion 100 through the tube. If additional access is needed to easily insert the seat belt 100 through the tube, the tube and seat may be adapted so that the belt may be guided through the tube, for example, by making the seat rear surface open in the region of the tube for access to the tube, and making the tube rear side partially open so the belt may be accessed of guided through the tube from the rear of the seat.

Figure 4:
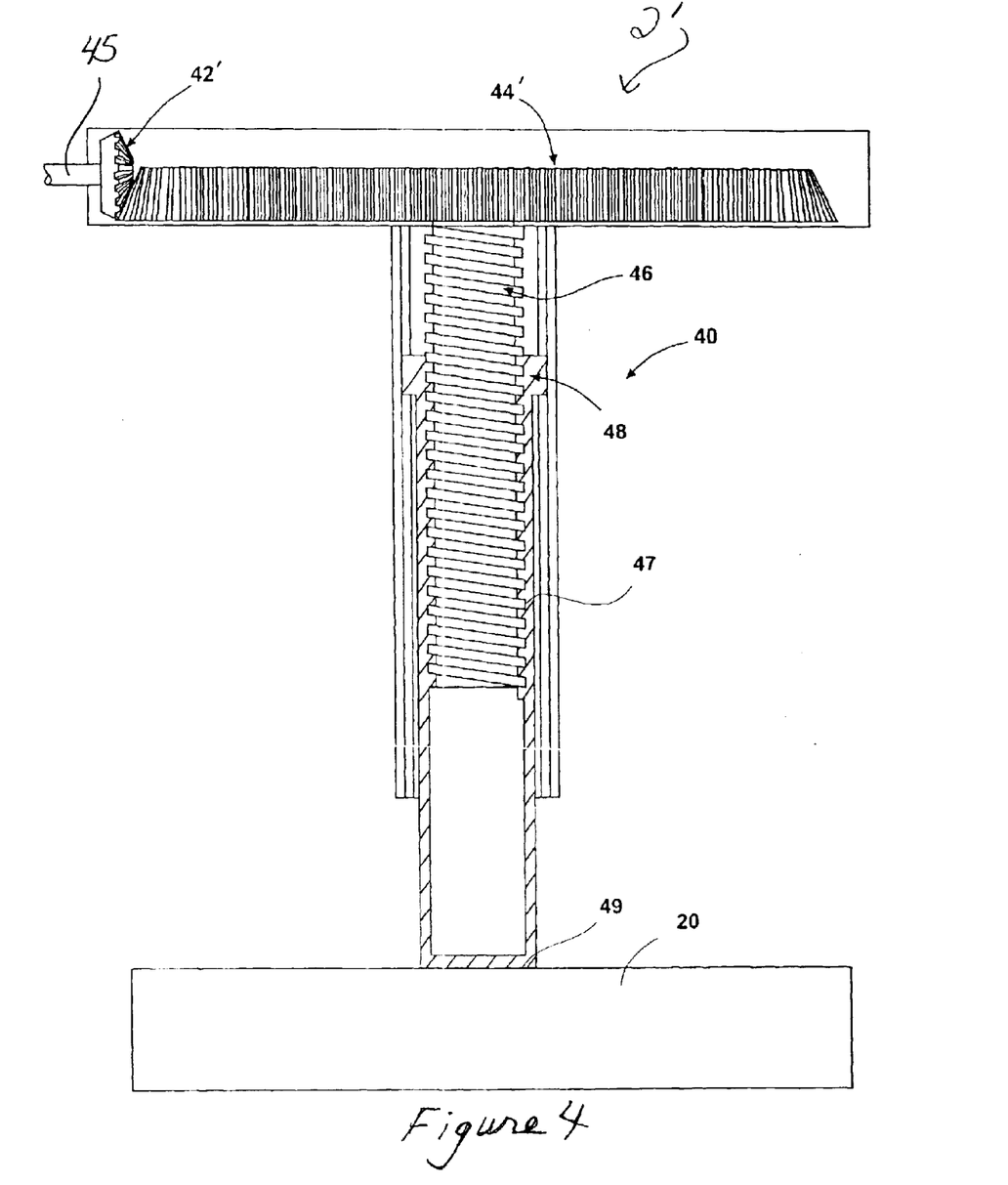
FIG. 4 shows the details of the hand-powered gear adjustment assembly of an alternative embodiment of the invention.

In alternative embodiments, the motor 32 may be eliminated and a hand operated means provided to rotate drive screw 46. For example, as shown in the tensioner system 2' of FIG. 4, gear 42', which engages ring gear 44', has axle 45 that extends to a hand-operated handle (51 in FIG. 5). In addition, tube 20 may be upwardly curved, so that its center is higher than its ends, to minimize any potential for abrasion or development of stress concentration points on the seat belt where it enters and exits the tube.

The materials used in this invention are selected to provide the necessary strength to each component to assure its full reliability, smooth operation, minimal or no maintenance, light weight, ease of manufacture and overall low cost. It is anticipated that in the preferred embodiment, frame 10, tube 20 and gear assembly 40 will be formed from high strength plastics. It is also acceptable for additional strength to form tube 20 from a high strength metal such as a steel alloy. The materials used in the gear assembly are selected for their self-lubricating and non-galling properties (e.g. Teflon™, or Delrin™). As with conventional child safety seats, known means for securing the child into the safety seat are incorporated, as well as common methods of providing appropriate padding of the frame to assure the child's safety and comfort.

Reversible motor 32 may be operated by the conventional 12VDC power provided in automotive vehicles. Its rotation speed is matched with gear ratios and the drive screw pitch of the gear assembly to provide a movement rate of tube 20 of about 10 inches per minute. Switch 50 is placed so that it is inaccessible to the child occupant of the seat (and any other child occupants in the vehicle).

The dimensions of the components of this invention are selected to provide the same performance features as the materials and indeed are determined in concert with material selection. For example frame 10 is appropriately sized for the child anticipated to be supported by the safety seat. Tube 20 has an internal diameter just sufficient to easily pass a conventional seat belt through its length. For example, when seat belt portion 110 includes the male portion of the buckle, the tube 20 is sized to accommodate that buckle portion as well as the flexible portion of the belt. The lengths of slots 15 are nominally 5 inches and the drive screw follower has a similar range of motion along the length of the drive screw.

Figure 5:
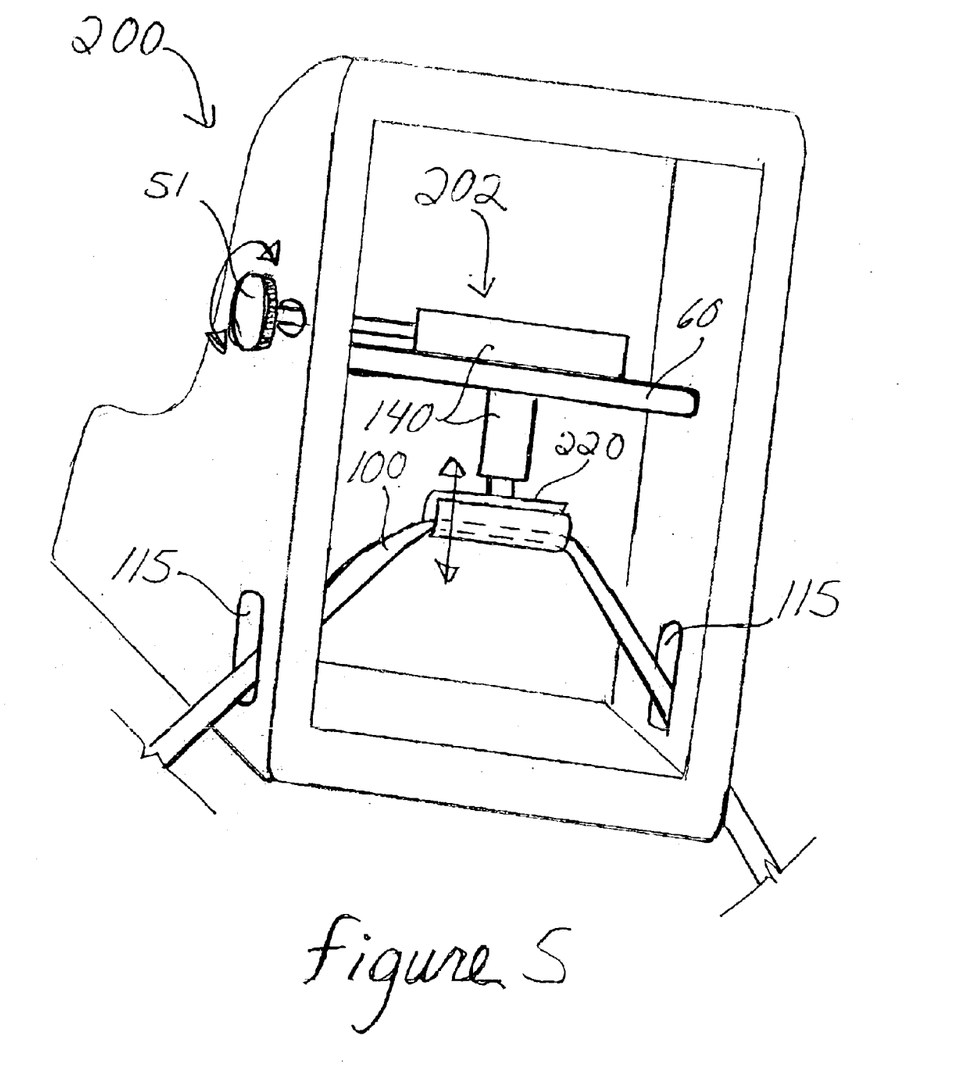
FIG. 5 is a schematic view of another embodiment of the invention.

FIG. 5 illustrates an alternative embodiment of the invented child safety seat 200, which includes yet another embodiment of a tensioner 202. This tensioner 202 is supported in the frame 10 by a horizontal brace 60 that is rigidly attached to the frame. The belt holder 220 is preferably a semi-cylinder with an open top side, into which the belt 100 may be placed. The ends of the belt holder 220 do not reach the sides of the frame 10 and do not extend through any slots in the frame. Preferably, only the belt 100 extends through slots 115 in the frame, so that no hard or sharp parts move in the slots, thereby, reducing the chance of fingers, clothing, or other items being caught in the slots during tightening of the belt. The belt holder 220 is raised and lowered, for example, by a manual handle 51 and gearing (collectively numbered 140), as discussed above. While the safety seat is shown with an open rear side for the sake of illustration, the safety seat's rear side may be substantially closed, except for a portal through which the belt-holder 220 and belt 100 may be accessed by the parent or caretaker when the seat is being installed in the vehicle.

Figure 6:
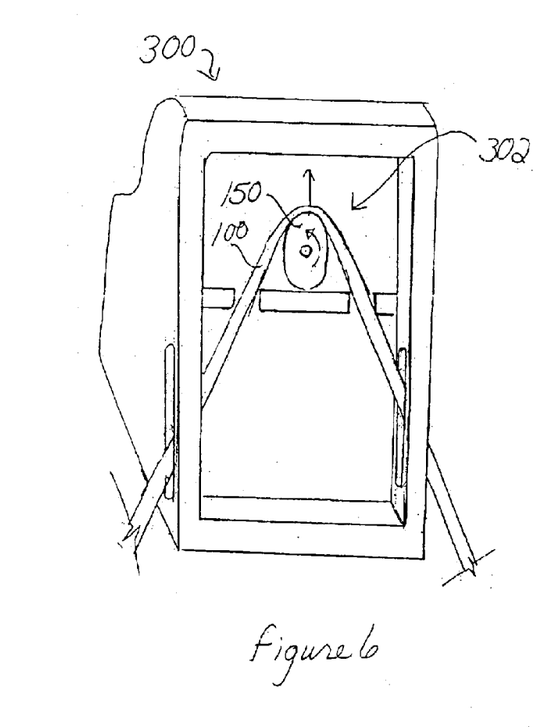
FIG. 6 is a schematic view of another embodiment of the invention wherein a cam-style tensioner is provided.

FIG. 6 illustrates another embodiment of a safety seat 300, which uses a cam-style tensioner 302. The cam 150 may be rotated by automatic or manual means (not shown) to a first position (in FIG. 6) that tightens the belt by placing the cam long dimension generally vertical to lift the belt, or to a second position (not shown, generally 90 degrees from the first position) that loosens the belt by placing the short dimension of the cam generally vertical. The tensioner 302 may include retaining structure (not shown) for retaining the belt in proper position on the cam, whether the cam is in the first or second position.

Figure 7:
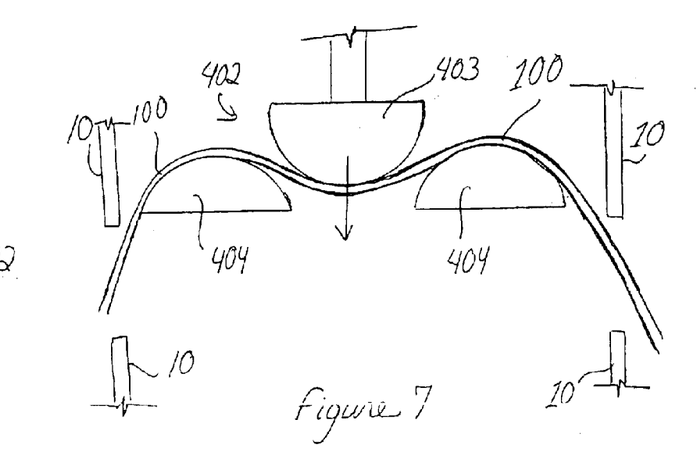
FIG. 7 is a schematic view of yet another embodiment of a tensioner of the invention.
Figure 8:
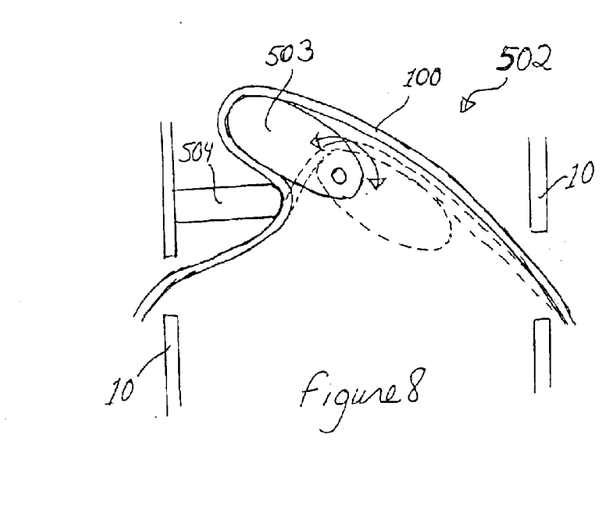
FIG. 8 is a schematic view of yet another embodiment of a tensioner of the invention.

FIG. 7 illustrates another embodiment of a tensioner 402 that features a central push-member 403 forces the belt 100 downward between two supporting structures 404 to tighten the belt, and that lifts up from the belt to loosen the belt. FIG. 8 illustrates another embodiment of a tensioner 502 that includes a cam-style member 503 that pushes the belt to the side against a structure 504 to tighten the belt. In FIG. 8, the cam-style member 503 is shown in pivoted into the tightening position, and is shown in dashed lines in the releasing position.

It is noteworthy that the tensioners 402 and 502 in FIGS. 7 and 8 utilize additional structure (404, 504) against which the belt is pushed or pulled to affect the direction of the belt movement and take up the slack. In the embodiment of FIG. 7, the combination of the central push-member 403 and the supporting structures may be considered the belt holder. In the embodiment of FIG. 8, the combination of the cam-style member 503 and the structure 504 may be considered the belt holder.

Thus, there are various ways of moving the belt within the child's safety seat that take up the slack of the belt, including pulling/pushing the belt up or down, forward or backward, or sideways in a manner that removes the slack. Preferably, the belt may be easily threaded through or looped over the belt tensioning system, so that parent or caretaker may do so without using tools and without spending substantial amounts of time. Preferably, the belt does not wrap or wind on a spool or reel. Preferably, the belt does not wrap more than about ½ wrap around any part of the tensioning system, that is not wrap more than about 180 degrees.

Although this invention has been described above with reference to particular means, materials and embodiments, it is to be understood that the invention is not limited to these disclosed particulars, but extends instead to all equivalents within the scope of the following claims.

I claim:

1. A child safety seat with integral seat belt tensioner for automotive vehicles comprising:

a child safety seat frame having an interior space;

a tensioning system within said interior space comprising a seat belt holder adapted to receive a seat belt, the seat belt holder being moveable in the safety seat frame to a first position wherein the seat belt is tightened relative to the safety seat frame and to a second position wherein the seat belt is loosened relative to the safety seat frame, wherein said tensioning system does not comprise means for winding the seat belt on said belt, and wherein said tensioning system comprises a cam member adapted to rotate to push against and move the seat belt relative to said frame.

2. A child safety seat with integral seat belt tensioner for automotive vehicles comprising:

a child safety seat frame having left and right sides, said sides each including an opening: a routing mechanism for routing the seat belt between the openings in said sides; and an adjustment mechanism for slidably moving said routing mechanism within said openings, said adjustment mechanism being connected between said frame and said routing mechanism;

wherein each of said openings is a nominally vertically disposed elongated slot and the adjustment mechanism is adapted to raise and lower the routing mechanism in the elongated slots;

wherein mechanism for routing the seat belt includes a seat belt receiving tube slideably received within said openings.

3. A child safety seat according to claim 2 wherein said adjustment mechanism includes a reversible motor and a gear assembly.

4. A child safety seat according to claim 3 wherein said gear assembly includes a pinon gear operatively meshed with a ring gear, a drive screw fixedly connected to the ring gear and a drive screw follower having a first end and a second end, the first end being operatively threaded onto the drive screw and the second end being fixedly connected to said seat belt receiving tube.

5. A child safety seat according to claim 3 wherein said motor receives electrical power from the vehicle and is reversibly controlled by an electrical switch.

6. A child safety seat according to claim 5 wherein the electrical power is provided by connecting said seat to the vehicle's accessory receptacle.

7. A child safety seat according to claim 2 wherein said adjustment mechanism includes a manual actuator removably connected to the drive screw.

8. A child safety seat according to claim 7 wherein said manual actuator is a hand crank.

9. A child safety seat according to claim 2 wherein said seat belt receiving tube is curved to minimize potential for seat belt abrasion or stress concentration.

10. A child safety seat according to claim 2 wherein said adjustment mechanism includes a manual actuator, gear assembly, and locking mechanism.

11. A child safety seat according to claim 11 wherein said manual actuator is a hand crank.

12. A child safety seat according to claim 10 wherein said gear assembly includes a drive screw fixedly connected to the ring gear and a drive screw follower having a first end and a second end, the first end being operatively threaded onto the drive screw and the second end being fixedly connected to said belt receiving tube.

13. A child safety seat according to claim 10 wherein said belt receiving tube is curved to minimize potential for seat belt abrasion or stress concentration.

* * * * *